J. S. REID.
BORING APPARATUS.
APPLICATION FILED OCT. 6, 1917.
1,281,420.
Patented Oct. 15, 1918.
2 SHEETS—SHEET 2.
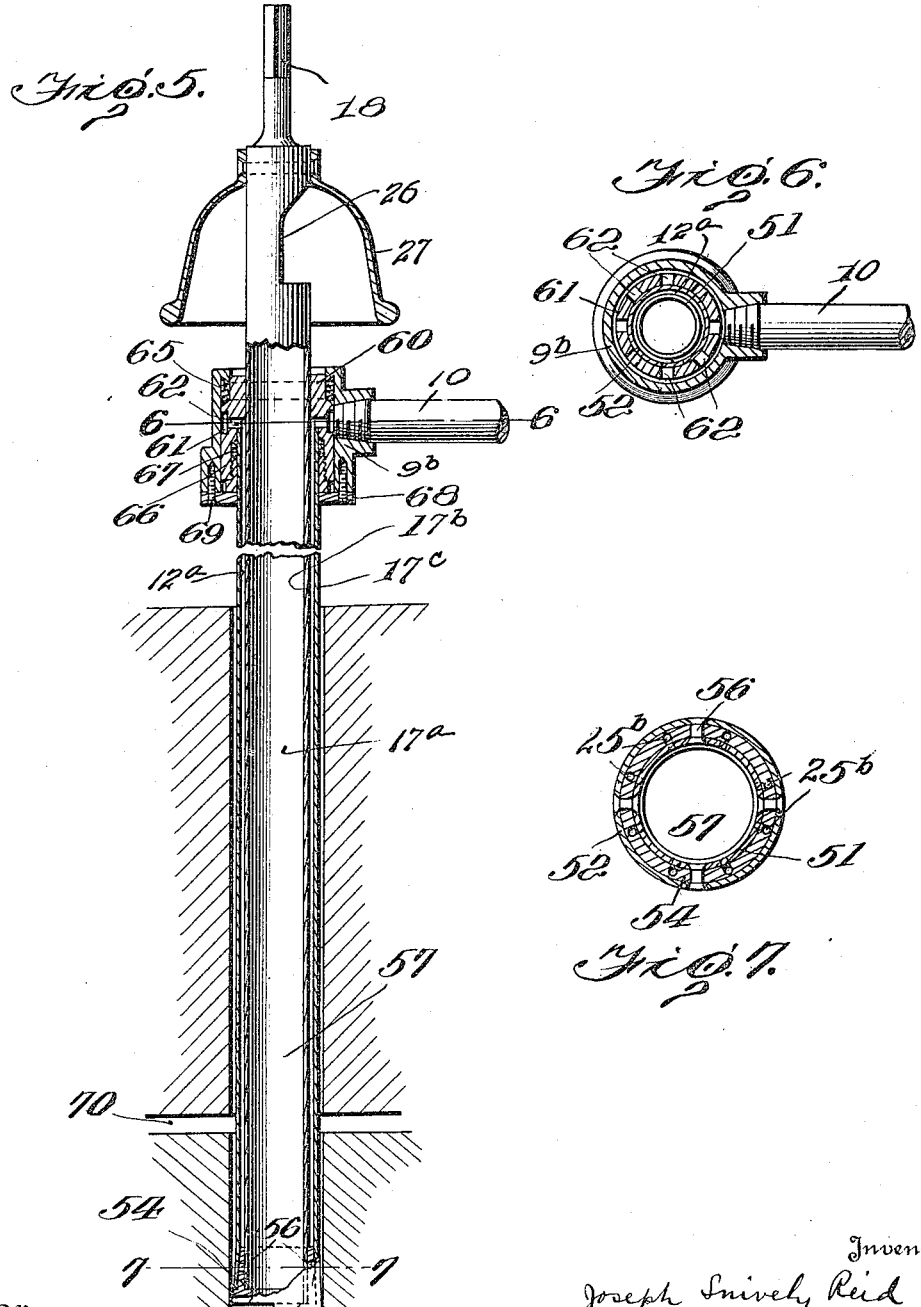

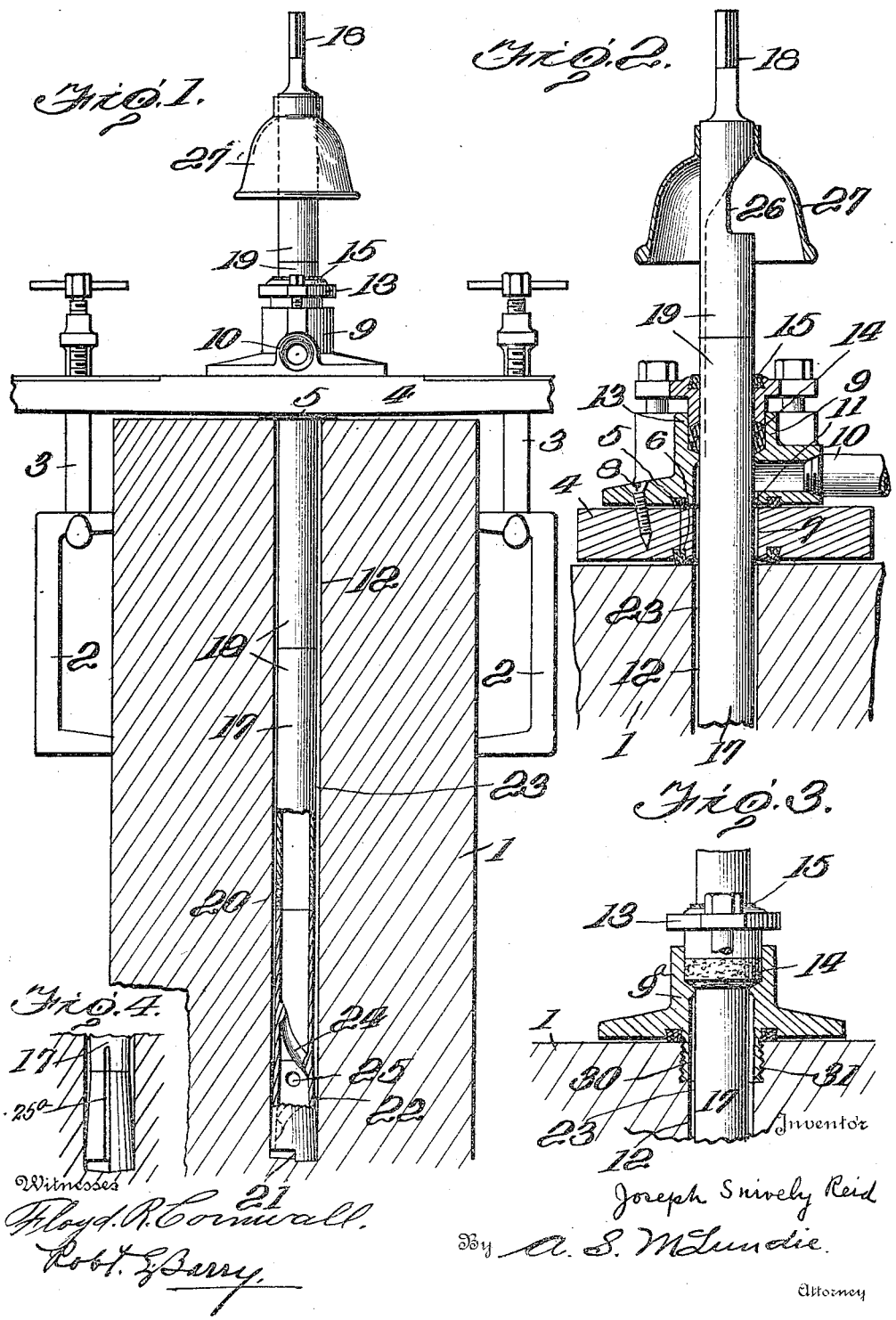

UNITED STATES PATENT OFFICE.

JOSEPH SNIVELY REID, OF OLEAN, NEW YORK.

BORING APPARATUS.

1,281,420. Specification of Letters Patent. Patented Oct. 15, 1918.

Application filed October 6, 1917. Serial No. 195,142.

*To all whom it may concern:*

Be it known that I, JOSEPH SNIVELY REID, a citizen of the United States, residing at Olean, in the county of Cattaraugus and State of New York, have invented certain new and useful Improvements in Boring Apparatus, of which the following is a specification.

My invention relates to improvements in boring tools and particularly to tools for boring thick or heavy timbers, but I do not wish to limit myself to this application of the invention, as I am aware that the same may be used for various other purposes.

In building wooden ships and the like many holes must be bored through the thick timbers, which form the keel of the boat. Because of the coarse cuts made by the boring tool now used for boring these holes, the surfaces or walls of the holes are very rough and the coarse chips cut by the boring tool will not feed up the holes, owing to the chips engaging these rough surfaces and choking the chip passage. It is, therefore, necessary with the augers now in use, to entirely withdraw the boring tool from the hole, as the boring proceeds in order that the hole may be cleared of these chips. The tool must not only be withdrawn but the pneumatic machine, which drives the same, must also be lifted with the tool, as the rotation of the auger must be maintained during withdrawal. These holes are from six to seven feet deep and only a short distance can be bored before it is necessary to lift the auger and driving mechanism (which weighs 30 pounds) in order that the hole may be cleared of chips. It can readily be seen that the drag of the rough chips and the auger in the hole will also add to the effort required in lifting the tool and driving mechanism.

It is, therefore, the principal object of my invention to provide a boring tool, which will bore as effectively as the tools now in use but which need not be lifted until the boring operation is finished.

A further object is to provide a boring tool which will discharge the chips and shavings without choking the hole.

A still further object of my invention is to provide a tubular boring tool with a flaring cutting head or end of greater diameter than the main portion of the tool, so that air or the like may be forced down the hole on the exterior of a tool having a solid wall or down a passage formed between the walls where a double walled boring tool is employed. The air or the like enters the interior of the tool at or near its cutting head and then passes upwardly through the smooth surfaced bore of the tool and carries the chips and shavings out of the hole.

A still further object is to provide a hollow boring tool having double walls with a passage between the same to permit air or the like to be fed to the interior of the tool without escaping through any cracks or crevices which might be in the timbers or work piece being bored.

With these and other objects in view, which will appear as the nature of the invention is better understood, my invention consists in the novel features hereinafter described, illustrated in the accompanying drawings and more particularly pointed out in the appended claims.

Referring to the drawings;

Figure 1 is a side view of my improved boring tool and the mechanism I employ for attaching the same to the work piece.

Fig. 2 is a fragmentary vertical sectional view of the same taken at right angles to Fig. 1.

Fig. 3 is a detail of a modification.

Fig. 4 is a detail of a further modification.

Fig. 5 is a vertical sectional view of my preferred form of boring tool having double walls with a conduit or passage between the same.

Fig. 6 is a horizontal sectional view taken on line 6—6— of Fig. 5.

Fig. 7 is a similar view taken on line 7—7 of Fig. 5.

In the embodiment of my invention illustrated in Figs. 1 to 3 inclusive, 1 represents the work piece which in this instance, is the keel timbers of a ship. Staples 2 are driven into the sides of the work piece near the top of the same and clamps 3 are connected to the staples and secure a bar 4 to the upper side of the work piece. An annular gasket or packing 5 is located in a recess 6 in the underside of the bar 4 and an aperture 7 is provided in the bar.

Secured to the upper side of the bar 4 by means of screws 8 (only one of which is shown) is a fitting 9 provided with an inlet pipe 10 for permitting compressed air or the like to enter through the aperture 7 into the hole 12, which is being bored. The packing 5 prevents the air from escaping between the bar 4 and the upper surface of the work piece. A packing gland 13 is bolted to the upper side of the fitting 9 and a packing 14 is located between the gland and fitting to prevent air from passing upwardly from the chamber 11. An oil packing 15 is located in a recess in the upper part of the gland to aid in preventing air from leaving the chamber 11.

My improved boring tool 17 is rotatably mounted in the gland and fitting, and is provided at its upper end with an angular shank 18, which is adapted to be connected to the driving mechanism (not shown) thus enabling the boring tool to be rotated. The tool 17 is preferably, though not necessarily, made up of a number of sections 19 secured together by screw connections 20. All of the sections are hollow or tubular, as shown, and each with the exception of the lower one has a smooth inner surface to permit chips or the like to pass freely through the same. The lower or boring section is outwardly flared toward its cutting end or head 21, as shown at 22, and the remaining sections are of less diameter than the cutting head, so that a passage 23 is provided between the outer surface of the tool and the wall of the hole, to permit the compressed air admitted to the hole, to pass downwardly in the same. The lower section is provided with an internal spiral thread 24 for the purpose of initially lifting or raising the chips and shavings and an aperture 25 is provided in the wall of the lower section to permit the compressed air to pass from the exterior to the interior of the tool and drive the chips upwardly until they are ejected through an orifice 26 in the upper section of the tool. A shield 27 is mounted on the upper section of the tool for the purpose of directing the chips downwardly after they leave the tool.

From the foregoing it is believed that the operation of my improved device will be apparent without further description of the same.

In the modification shown in Fig. 3, I have eliminated the staples 2, clamps 3 and bar 4, and in lieu thereof I have provided a fitting $9^a$ with an extension 30 having exterior threads 31 which are designed to be screwed into a previously prepared counter sink in the work piece, for the purpose of securing the device to the same.

In the modification shown in Fig. 4, I have shown the cutting section of the tool provided with a groove $25^a$, which may be employed instead of the hole 25, for the purpose of feeding air from the exterior to the interior of the tool.

In the embodiment of my invention shown in Figs. 5 to 7 inclusive, $17^a$ designates the boring tool which in this instance has double walls $17^b$ and $17^c$ spaced away from each other to provide a passage $12^a$. The lower ends of the walls are secured together and to the cutting head 54 by means of rivets 56, and ports $25^b$ pass through the cutting head to permit air in the passage $12^a$ to enter the interior 57 of the boring tool. The upper end of the tool is provided with an angular shank 18 for attachment to the driving mechanism and an aperture 26 is provided near the upper end of the tool to permit chips to pass from the interior of the tube to the exterior of the same. A fitting 60 is loosely mounted near the upper end of the tool and has an annular recess 61 communicating with the passage $12^a$ by means of the ports 62 so that air or the like may enter the fitting through the pipe 10 and pass into the passage $12^a$ formed between the walls of the boring tool. The pipe 10 is screwed into a casing $9^b$ which surrounds the fitting 60 and a packing 65 is provided between the upper portions of the fitting and casing to prevent air from passing upwardly between said parts. A hollow screw 66 is employed to compress a packing 67 between the fitting and the upper portion of the outer wall of the tool and while this packing and screw permit the boring tool to turn in the fitting they will prevent air from passing downwardly between these parts. A plate 68 is secured to the lower end of the casing $9^b$ by means of the screws 69 to prevent loosening of the hollow screw 66.

In this instance it will be seen that the fitting and its casing descend with the tool and are not secured to the work piece as with the device shown in Figs. 1 to 4, and it will be also seen that by providing the tool with a double wall having an air passage between the same that air can be forced to the interior of the boring tool without liability of escaping through cracks or crevices in the work piece, such as shown at 70 in Fig. 5, of the drawing.

I do not wish to be limited to the exact details herein set forth, as numerous modifications may be made in the structure shown, without departing from the spirit of the invention or sacrificing any of its advantages.

What I claim and desire to secure by Letters Patent is:—

1. A boring device comprising a tubular section carrying and rotating an inward delivering boring head whose cutting cross section is sufficiently larger than such tubular section to form a bore providing an annular space surrounding said tubular section and communicating with the interior of said tubular section, and means for so closing said annular space that fluid under heavy pressure introduced thereinto must enter said tubular section near the delivery from said head and impel the chips backward through the tubular section.

2. A boring device as defined in claim 1 in which the annular fluid pressure receiving space is surrounded by a rotatable tube.

In witness whereof I set my hand and affix my signature.

JOSEPH SNIVELY REID.

Copies of this patent may be obtained for five cents each, by addressing the "Commissioner of Patents, Washington, D. C."